United States Patent
Decotignie et al.

(10) Patent No.: US 6,370,400 B1
(45) Date of Patent: Apr. 9, 2002

(54) METHOD FOR AVOIDING FRAUDULENT USE OF A MOBILE RADIOTELEPHONE BY BLOCKING AN INTERFACE AFTER A CERTAIN INACTIVE PERIOD OF TIME AND MOBILE RADIOTELEPHONE PERFORMING THE SAME

(75) Inventors: Philippe Decotignie; Sabine Giorgi, both of Le Mans (FR)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/353,989

(22) Filed: Jul. 15, 1999

(30) Foreign Application Priority Data

Jul. 16, 1998 (FR) .................................... 98 09105

(51) Int. Cl.⁷ ........................... H04B 1/38; H04M 3/16
(52) U.S. Cl. ...................... 455/565; 455/26.1; 455/411
(58) Field of Search ................. 455/26.1, 565, 455/566, 550, 575, 410, 411, 404, 445, 567

(56) References Cited

U.S. PATENT DOCUMENTS

| | | | |
|---|---|---|---|
| 4,908,848 A | | 3/1990 | Hanawa ...................... 455/565 |
| 4,945,556 A | * | 7/1990 | Namekawa ................. 455/565 |
| 5,212,810 A | * | 5/1993 | Maeda et al. ............... 455/528 |
| 5,864,765 A | * | 1/1999 | Barvesten ................... 455/565 |
| 5,978,670 A | * | 11/1999 | Casoli et al. ............... 455/411 |

FOREIGN PATENT DOCUMENTS

| | | | | |
|---|---|---|---|---|
| WO | 97/32426 | * | 9/1997 | ............ H04M/1/72 |
| WO | 97/42786 | * | 11/1997 | ............ H04Q/7/38 |

OTHER PUBLICATIONS

Japanese Abstract, 3–189811, Publication Date Aug. 8, 199 INT. CL. G06F 3/02.

* cited by examiner

*Primary Examiner*—William Trost
*Assistant Examiner*—Rafael Perez-Gutierrez
(74) *Attorney, Agent, or Firm*—Dicran Halajian

(57) ABSTRACT

A telephone includes circuits that enable a user of the telephone to receive incoming calls and set up outgoing calls. A controller puts the telephone interface in a blocking state to prevent normal use of the telephone when the interface receives a block signal, and puts the interface in a service state to make the telephone accessible. The telephone has a timing circuit that supplies the block signal to the controller after a given period of inactivity of the telephone to place the telephone in the blocking state. An erroneous unblocking code used a predetermined number of times puts the telephone in a state of total block which includes a power cut of the telephone. Turning on the telephone allows leaving the total block state.

7 Claims, 2 Drawing Sheets

METHOD FOR AVOIDING FRAUDULENT USE OF A MOBILE RADIOTELEPHONE BY BLOCKING AN INTERFACE AFTER A CERTAIN INACTIVE PERIOD OF TIME AND MOBILE RADIOTELEPHONE PERFORMING THE SAME

FIELD OF THE INVENTION

The present invention relates to a mobile radiotelephone formed by circuits enabling its user to receive incoming calls and set up outgoing calls, which device comprises:

an interface between the user and the circuits of the device, including a blocking/unblocking means for putting the interface in a blocking state to prevent the normal use of the radiotelephone when the interface receives a block-activation signal and for putting the interface in a service state to make the radiotelephone accessible to the user when the interface receives an unblocking signal.

BACKGROUND OF THE INVENTION

The invention also relates to a method for protecting such a device.

Such devices are well known and find many applications, in the field of portable telephones. These devices are intended to accompany their users and it happens that these users leave them unnoticed for an instant at a frequented location. This may thus lead to the device being stolen or even used by a person who seizes the opportunity to exchange costly communications.

It is known from United States patent nr. U.S. Pat. No. 4,908,848 to block or restrict the use of said device.

However, this type of blocking is poorly adapted to radiotelephones, because one must not forget to block the device the moment one has finished using it and it is necessary for the user to put the radiotelephone in a blocking state by pressing some key on the keyboard.

SUMMARY OF THE INVENTION

It is an object of the present invention to provide a device of the type defined in the opening paragraph, well adapted to the use of mobile radiotelephones, which enables to resolve this problem of forgetting.

Therefore, such a device is characterized in that it comprises a timing circuit for supplying an activation signal to said blocking circuit after a predetermined period of inactivity of the device.

The idea of the invention is to avoid calls being made which are not authorized by the proprietor of the device. Furthermore, it is desired that incoming calls be processed in a transparent manner.

A characteristic feature according to which an access to said circuits for an outgoing emergency call is given provides the advantage that the device ensures a security function for anyone for whom, in the case of need, it is necessary to make this emergency call.

BRIEF DESCRIPTION OF THE DRAWINGS

These and other aspects of the invention will be apparent from and elucidated with reference to the embodiments described hereinafter.

In the drawings.

DETAILED DESCRIPTION OF THE INVENTION

Figure 1:
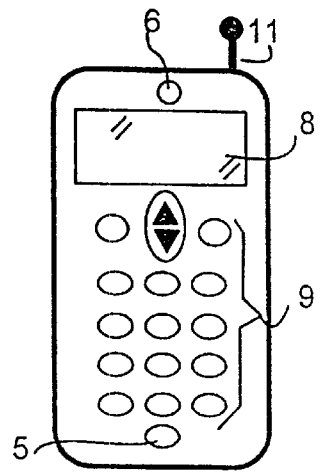
FIG. 1 shows a device according to the invention.

In FIG. 1 is represented an electronic device according to the invention. Within the framework of the example described, this is a portable radiotelephone of the type used in cellular systems. It is formed by a microphone 5, an earphone 6, a display 8, a keyboard 9 and an antenna 11.

Figure 2:
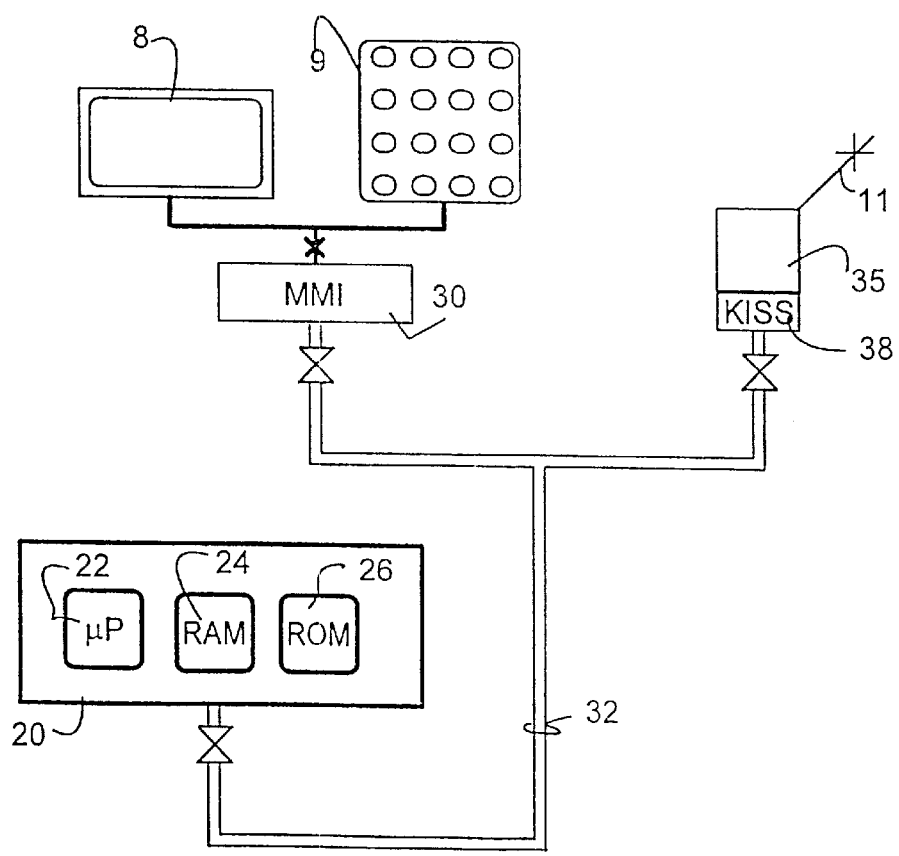
FIG. 2 shows the overall electrical diagram of the device of FIG. 1.

FIG. 2 shows the overall electrical diagram of this device. Like elements to those of the preceding Figure carry like references. The operation is, in essence, governed by a microprocessor assembly 20 comprising in known manner a microprocessor 22 to which are associated a random access memory 24 and a read-only memory 26. This assembly is connected to the interface 30, commonly called man-machine interface, by a common line 32. This interface makes it possible for the user to carry out commands with his telephone with a view to using its possibilities. It is thus possible to block one or various commands to the screen 8 and/or coming from the keyboard 9. Thus a blocking/unblocking means for blocking or unblocking the operation of the radiotelephone is easily formed. The assembly 20 also acts on a transceiver assembly 35 to which the antenna 11 is connected while an interface circuit 38 is passed through.

Figure 3:
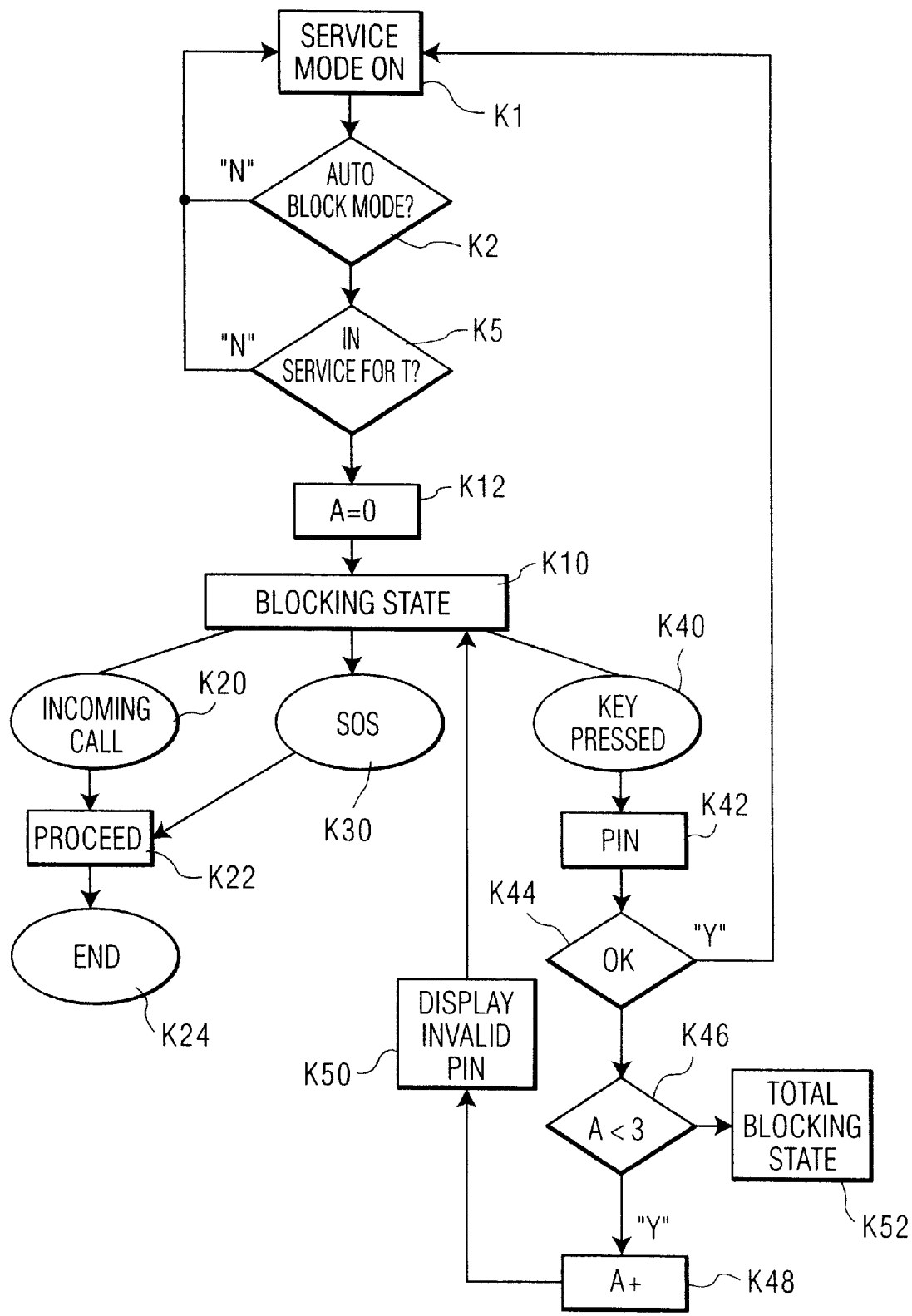
FIG. 3 is a flow chart explaining the operation of the device of FIG. 1.

FIG. 3 is a flow chart to explain the operation of the device of FIG. 1. This flow chart starts with box K1 which indicates that the service mode is on, that is to say that one has access to all the functions of the device. When in this mode, there is examined whether the user, box K2, has requested the automatic blocking mode. This mode is requested for example in a configuration menu. If this automatic blocking mode is requested, there is examined (box K5) whether the device has been in the service mode for a certain period of time T, for example, for a period of time of the order of 5 minutes. If this is not the case, this service mode as indicated in box K1 is continued. If the device has not been in service for a certain period of time T, the blocking state according to the invention is automatically proceeded to, box K10, by going through box K12 which explains the start of a number of attempts to introduce an unblocking code to put an end to this blocking state.

To abandon this blocking state, at least three ways as indicated in this flow chart of FIG. 3 are proposed.

The first way is formed, in accordance with an aspect of the invention, by an incoming call, box K20. This call is processed in the habitual manner, like any other call, box K22. When the call has ended, the procedures of end-of-communication are carried out, box K24.

The second way is the one that implies an emergency call or a call for assistance. Anybody, either the proprietor of the device or not, dials the number or one of the numbers assigned to the emergency calls, box K30; the recognized number causes the execution of the procedure mentioned above (box K22).

The third way is the one that is permitted to the person who knows the unblocking code assigned to the function; this code will be, according to an example of embodiment, the PIN code (see standards relating to the GSM cellular radiotelephone systems) used when the device is put into operation. For this purpose, a key of the keyboard is depressed (box K40) which makes that the user is asked for the PIN code, box K42. If this number is recognized (test of box K44), the blocking state is changed into the service state, box K1. If this number is not recognized the value of the variable A initialized in box K12 is tested in box K46. If this value is lower than a certain figure, for example 3, then the value of A is increased by unity, box K48. A message signaling that the code is not valid (box K50) is shown to the user on his display 8. The device returns to its blocking state, box K10. If the variable is higher than said figure, then the test of box K46 causes the device to be totally blocked indicated by box K52. This total blocking state may be, for example, a power cut. It is thus only possible to leave this total blocking state by switching the device on again.

What is claimed is:

1. A mobile radiotelephone formed by circuits enabling its user to receive incoming calls and set up outgoing calls, which radiotelephone comprises:

an interface between the user and the circuits of the radiotelephone;

blocking/unblocking means for putting the interface in a blocking state to prevent normal use of the radiotelephone when the interface receives a block-activation signal, and for putting the interface in a service state to make the radiotelephone accessible; and a timing circuit for supplying the block-activation signal to said blocking/unblocking means after a predetermined period of inactivity of the radiotelephone to place the radiotelephone is the blocking state;

wherein an erroneous code used several times puts the radiotelephone in a state of total blocking, the total blocking state including a power cut of the radiotelephone, and wherein for leaving the total blocking state the radiotelephone is to be switched on.

2. A method for protecting the mobile radiotelephone as claimed in claim 1, comprising:

assigning an unblocking code, detecting said predetermined period of inactivity, changing from the service state to the blocking state after detection of said predetermined period of inactivity, changing from the blocking state to the service state after the unblocking code has been entered, and allowing access to the circuits of the radiotelephone.

3. A mobile radiotelephone as claimed in claim 1, wherein an unblocking signal is produced by said blocking/unblocking means for an outgoing emergency call.

4. A mobile radiotelephone as claimed in claim 1, wherein the blocking state allows predetermined ones of said outgoing calls.

5. A mobile radiotelephone as claimed in claim 1, wherein an unblocking code is used for forming an unblocking signal.

6. A telephone comprising:

circuits configured to enable a user of the telephone to receive incoming calls and set up outgoing calls;

an interface between the user and the circuits;

a controller configured to put the interface in a blocking state to prevent normal use of the telephone when the interface receives a block signal, and to put the interface in a service state to make the telephone accessible; and a timing circuit configured to supply the block signal to said controller after a given period of inactivity of the telephone to place the telephone in the blocking state;

wherein an erroneous unblocking code used a predetermined number of times puts the telephone in a state of total block, the total block state including a power cut of the telephone, and wherein turning on the telephone allows leaving the total block state.

7. A method for protecting a telephone comprising:

assigning an unblocking code;

changing from a service state to a blocking state after detection of an inactive period;

changing from the blocking state to the service state upon entering of the unblocking code;

changing from the blocking state to a total block state which includes a power cut of the telephone after an erroneous code has been entered a predetermined number of times; and leaving the total block state in response to turning on the telephone.

* * * * *